United States Patent Office 3,450,106
Patented June 17, 1969

3,450,106
TANDEM SEPARATOR ARRANGEMENT
Harvey H. Nelken, River Edge, N.J., assignor to Foster Wheeler Corporation, Livingston, N.J., a corporation of New York
Filed Feb. 23, 1968, Ser. No. 707,762
Int. Cl. F22b 37/26; F16t 1/00; B01d 45/12
U.S. Cl. 122—491                                    6 Claims

ABSTRACT OF THE DISCLOSURE

A system for separation of vapor and liquid for use with vapor generators comprising in part an improved arrangement of components to increase the capacity of the system for a given drum size.

---

Figure 1:
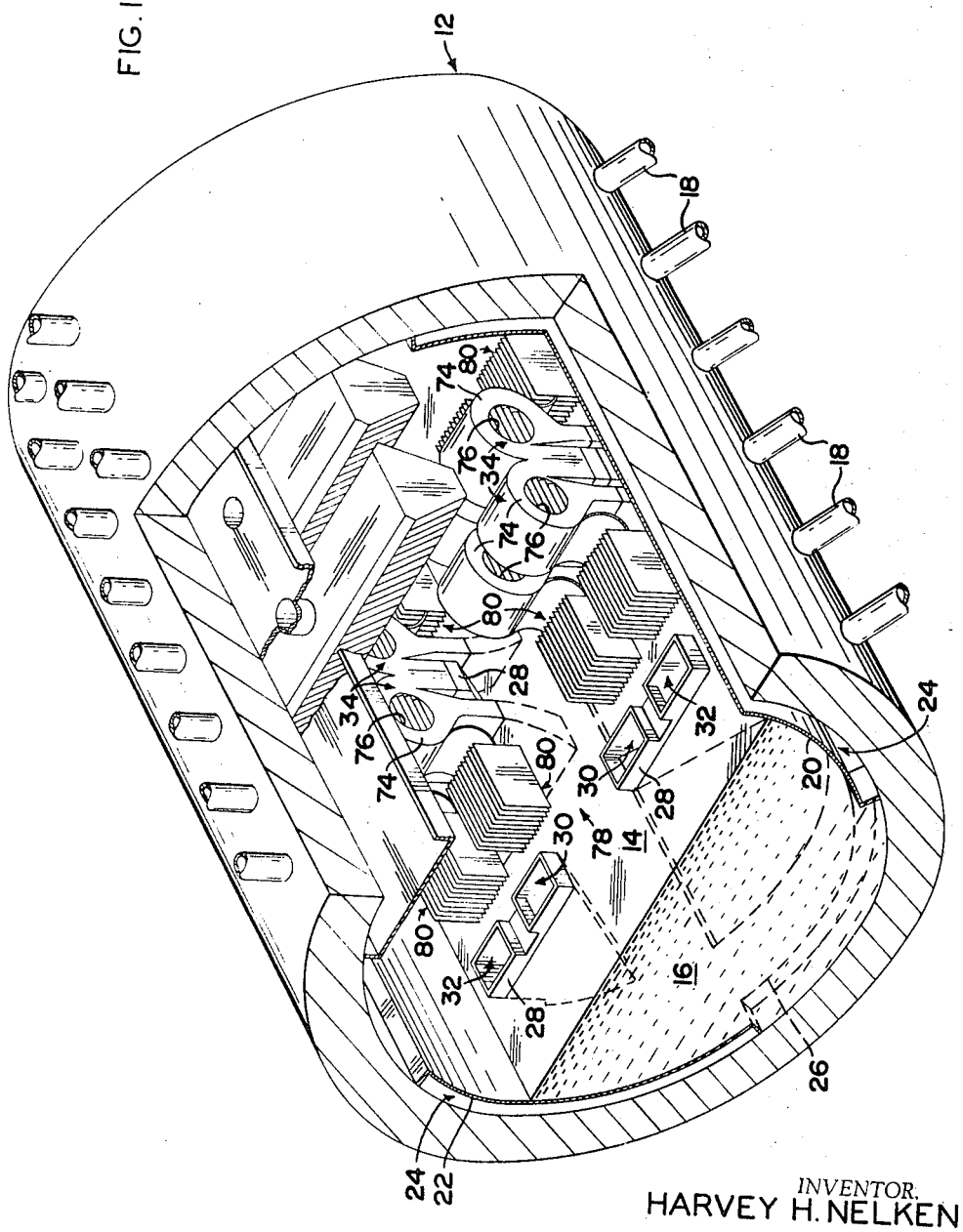

This invention relates to the separation of fluids from mixtures thereof, and more particularly to the separation of vapor and liquid from mixtures of the same.

In particular, the invention relates to a novel arrangement of components within a drum of a natural circulation vapor generator designed to increase the capacity of the separation system for a given drum size.

In natural circulation generators, mixtures of steam and water rise in heated steam-generating tubes and discharge into one or more large drums disposed above the tubes, the separation of steam from water occurring in separation components within the drums. The steam passes from the generator drum through openings in the upper portion of the drum, while the water remaining in the drum recirculates through downcomers back to the steam-generating tubes.

Trouble-free operation of a natural circulation unit, particularly at high pressures, requires efficient separation of steam and water with an adequate and properly distributed supply of water to the steam-generating tubes. The separation equipment accordingly has two essential functions. One is the separation of steam from water in order that the downcomer system will be provided with the de-steamed water necessary for proper and safe circulation. The other is the separation of moisture from the steam flow to provide high steam purity.

In that efficiency in a natural circulation steam generator is in part a function of operating pressure, generator pressures in recent years have been increased as much as possible. However, with the increase in pressure, the density of the flow in the steam-generating tubes begins to approach the density of the flow in the downcomers, reducing the head or natural circulation driving force, and making the separation of steam from the water entering the downcomers, or de-steaming the water, of critical importance. As an aspect of increasing the efficiency of separation, it is necessary to resort to higher capacity components, but this in turn requires increased drum sizes. As the drums are a major expense in a natural circulation unit, the economic dividing line between choice of a natural circulation unit over choice of another type of steam generating unit is limited to relatively small capacity or low megawatt service.

It is object of the invention to provide a natural circulation steam generator design which at higher capacities remains competitive with other types of steam generating units.

In accordance with the invention, there is provided a vapor generator comprising a drum casing having a generally cylindrical configuration, the axis of the drum being on a substantially horizontal plane. Vapor generating components are operatively associated with the drum to introduce a vapor and liquid mixture into an inlet space within the drum. In communication with the inlet space are a plurality of separators or separator cans each having a front face and a back face, a rearward downwardly facing inlet end, a forward also downwardly facing outlet end, and an involute shaped separation chamber extending between the inlet and outlet ends. Each side of each separator can is provided with an opening or aperture means approximately centrally disposed in the side for the flow of vapor separated from the mixture. Pairs of separator cans are arranged back-to-back or in tandem relationship, a single inlet being common to both cans, and the separators are arranged within the drum in at least four longitudinally extending rows, in groups of eight, with four pairs in side-by-side relationship.

Figure 2:
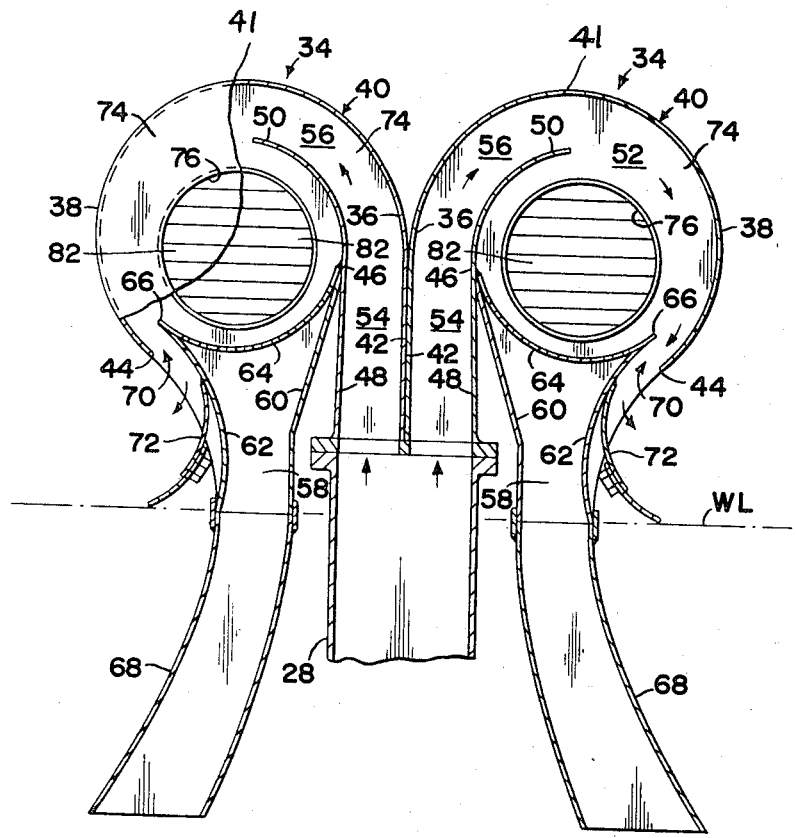

The invention and advantages thereof will become apparent upon consideration of the following specification, with reference to the accompanying drawings, in which:

FIGURE 1 is a partial section perspective view of steam drum and separation components in accordance with the invention; and, FIGURE 2 is a section elevational view of one of the separation components of FIGURE 1.

Referring to the figures, the reference numeral 12 designates a steam and water drum of a steam generator having an upper vapor space 14, and a lower liquid space 16. Banks of steam-generating tubes 18 are connected at their upper ends to the lower portion of the drum 12. A downcomer (not shown) leads from the liquid space 16 of the drum to return water to headers at the bottom ends of the steam generating tubes.

Further details on the drum can be had with reference to Patent No. 2,675,888, J. Blizard et al., issued to assignees of the present application. For purposes of the present application, it is necessary only to make reference to items 20 and 22, curved sheets or girth baffles on the lower opposite sides of the drum, spaced from the drum and generally concentric therewith defining with the drum annular inlet chambers 24 in communication with the steam generating tubes 18. Between the opposed chambers 24, equalizing passages 26 are provided for the purpose of equalizing the pressures in the opposed chambers.

Mounted on the curved sheets or girth baffles 20 and 22, longitudinally lengthwise along the drum on the sides thereof and up somewhat from the bottom, are a plurality of Y-shaped hollow supporting containers 28, welded to the girth baffles or curved sheets 20 and 22, and also in fluid communication with the annular inlet chambers 24. At the upper ends of the containers 28, the containers divide into side-by-side or transversely disposed passages 30 and 32, the passage 30 being a branch of the passage 32, inwardly angled away from the wall of the steam drum. Separating components, to be described, are supported on the containers 28, in communication with the passages 30 and 32.

Turning to FIGURE 2, each separation component, or can as it is often called, generally designated with the numeral 34, comprises a back face 36 and a front face 38. An outer plate 40, which defines both the front and back faces 36 and 38, extends upwardly as a lower flat vertical rear surface curving at the top 41 of the can towards the front face defining an approximate involute curve, and then curving downwardly and inwardly to a point 44 roughly 250° from the beginning of the curve. The upper and forward chamber 52 defined by the outer plate can be considered the separation chamber of the can. An inner plate 46 is spaced from the outer plate and also has a vertically extending lower section 48, and a curved upper part 50 which extends into the separation chamber 52 about 90°. The upper part 50 of the inner plate is curved so that the inner plate provides, with the outer plate, an upwardly extending inlet chamber 54 and a gradual tapered area 56 leading into the separation chamber.

In this way, the inner and outer plates together provide a tangential steam and water inlet leading into the separation chamber wherein a high velocity flow accelerated by the tapered inlet passes along the upper curved surface of the outer plate with the heavier liquid portion of the flow remaining along the outer plate. Vapor separated from the mixture flows to the center of the separation chamber.

Communicating with the separation chamber 52 adjacent the lower front face of the can or separator is a downwardly extending funnel-shaped water outlet conduit 58 defined on opposite sides by a first member 60 adjacent to and welded to inner plate 46 (on the frontal side thereof), and a curved member 62 spaced from the member 60 and extending upwardly into the separation chamber 52 a distance slightly above the point 44 or lower edge of the outer plate 40. Across the upper end of the funnel-shaped outlet conduit 58, a downwardly curved perforated baffle 64 is provided welded to the top edges of both members 60 and 62. The perforated baffle 64 is provided with a forward or leading knife edge 66, relative the direction of flow within the can, for the purpose of reducing disturbance at this point to a minimum. The bottom of the funnel-shaped outlet conduit is connected to a downwardly projecting extension 68 leading below the surface of the water designed to carry the flow below the water surface.

The curved member 62, and knife edge 66, are also spaced from the outer plate 40, at its lower edge, and in particular, point 44, to define a second outlet passage 70 which passage is well above the water level within the drum. Slightly below the second outlet passage 70, a curved deflector plate 72 is welded to the member 62, being curved downwardly and in a forward direction to deflect the flow in the second outlet 70 in a forward direction onto the surface of the water within the drum.

In operation the flow of feed water into the drum is so regulated that the level thereof is maintained at a normal water level, WL. The upwardly flowing steam and water mixture, flowing from steam generating tubes 18, flows into the annular inlet chambers 24, and from there into the Y-shaped supporting containers 28. The steam and water mixture then flows upwardly in inlet chamber 54, of each can associated with the supporting members 28, and is tangentially projected into the separation chamber 52 of each separator. The liquid flow which becomes a layer of water hugs the inside wall of the outer plate 40 and passes outwardly through the second outlet passage 70 onto deflector plate 72 and onto the surface of the water in the drum. A layer of steam and water which is on top of or covering the layer of water flows onto the perforated baffle 64 with water droplets passing downwardly through the funnel shaped outlet conduit 58 to below the water level in the drum. The purpose of the perforated baffle 64 is to de-steam the layer of steam and water which has been separated by knife edge 44 from the higher density layer exiting in passage 70. It will be recalled the flow of water in downcomers leading from the drum should be substantially free of entrained steam. The opposite sides of separating components or cans 34 are closed or covered with side covers 74, each side cover having an opening 76 centrally disposed therein. Steam which is separated from the water in the separation chamber passes axially and laterally through the openings 76 and into the steam space 14 of the drum. Referring to FIGURE 1, the drum has near the top thereof horizontally disposed chevron driers, for imparting further dryness to the steam, which driers are also described in Patent No. 2,675,888, mentioned above.

Referring again to FIGURE 1, the cans of separating components 34 are arranged in pairs in back-to-back relationship, the pairs of cans having a common back face 36 or wall of the outer plate 40. Each passage, the inside and outside passages 30 and 32 of each Y-shaped supporting container or member 28 is in communication with a pair of the cans 34 so that the flow in a passage of the supporting member splits and passes half to one can and half to the other of each pair. In that the supporting members 28 are oriented to provide laterally across the drum four passages, it is evident that the separating components or cans are arranged in four rows of tandem assemblies or back-to-back assemblies lengthwise along the drum; or in groups of eight with four pairs in side-by-side relationship.

In the past, for instance in the above mentioned Patent No. 2,675,888, the drum internals, including the separating components or cans, have been disposed in a single row located along the sides of the drum, with the chevron drier assemblies arranged along the top of the drum. In a typical example in accordance with the invention, a minor increase in drum internal diameter from sixty to sixty-six inches and a rearranging of the separators or cans into four rows of tandem assemblies, achieved a fifty percent increase in the number of separators installed per foot of drum. The net effect is a capacity increase of approximately fifty percent per foot of drum length, without changing the geometry of the separators in any way from the improved geometry of those of Patent No. 2,675,888 which have been so successfully used to date. In other words, the invention, in part, can be characterized as the discovery that the improved geometry of the separators of Patent No. 2,675,888 can very advantageously be used to achieve a marked increase in capacity, with little or no increase in drum size. In addition, the arrangement provides adequate access by means of the middle aisle 78 to permit installation and servicing of components within the drum.

It has been found that the high velocity liquid flow which leaves outlet passage 70 may entrain a considerable amount of vapor which can be carried downwardly into downcomers leading from the drum. A preferred embodiment of the invention includes the provision of impedance members 80 disposed at the surface of the water level in the drum and at the outlets for the passages 70. The impedance devices may consist of bodies of wire mesh about three inches in thickness or corrugated plates or like devices. With bodies of wire mesh, tests run have shown surprising effectiveness of the mesh in dissipating the flow energy and preventing entrainment. The wire mesh breaks up the high velocity stream into a plurality of small downwardly flowing streams having little energy and little capacity for trapping vapor.

As a further preferred aspect of the present invention, there are provided baffle blades 82 in the openings 76 in the sides of the separating components or cans 34 designed to prevent water droplets from being carried over in the steam which is discharging from the openings on opposite sides of each separating can. In that external shrouding requires valuable space inside the steam drum, and increases field installation costs unnecessarily, the baffles, in the shape of Venetian blinds or corrugated, are placed directly in the side openings of the can. The devices are easily shop installed eliminating undue field work.

Although the invention has been described with reference to specific embodiments, variations within the scope of the claims will be apparent to those skilled in the art.

What is claimed is:

1. A natural circulation vapor generator comprising
a drum casing having a generally cylindrical configuration, a longitudinal axis extending in a substantially horizontal plane;
means to introduce a vapor and liquid mixture from vapor generating components of the generator into said drum casing;
said drum casing comprising inlet chambers at least along opposite sides thereof in fluid communication with said riser means;
a plurality of can-like vapor and liquid separators on horizontal axes each comprising a front face and a back face;

each separator comprising an inlet facing downwardly adjacent the back face, an outlet also facing downwardly adjacent the front face, means defining an involute shaped separation chamber extending between said inlet and outlet;

passage means communicating the separator inlets with the casing inlet chambers;

pairs of separators being positioned back-to-back in tandem relationship, a single passage means being common to both separator inlets of each pair;

the separators being arranged within the drum casing in four side-by-side rows of tandem assemblies with the axes of the separators at right angles to the axis of the drum casing, the rows extending longitudinally within the drum.

2. Vapor and liquid separating means for a vapor generator comprising a drum casing having a generally cylindrical configuration, a longitudinal axis extending in a substantially horizontal plane;

curved plate means slightly spaced from the inside of said drum casing along the sides thereof and substantially concentric with the casing defining with the casing opposed girth inlet chambers;

means to introduce a vapor and liquid mixture from the generator into said inlet chambers;

a plurality of can-like vapor and liquid separators on horizontal axes each comprising a front face and a back face;

each separator comprising an inlet facing downwardly adjacent the back face, an outlet also facing downwardly adjacent the front face, plate means defining an involute shaped separation chamber extending between said inlet and outlet;

passage means communicating the separation chamber inlet with a casing inlet chamber to introduce the vapor and liquid mixture tangentially into said separation chamber, the liquid portion of the mixture exiting forwardly out the separation chamber outlet;

end walls for said separation chamber;

openings centrally disposed in said end walls for the flow of the vapor portion of the mixture from the separators;

pairs of separators being positioned back-to-back in tandem relationship, a single passage means being common to both separator inlets of each pair;

said separators being arranged within the drum casing in four side-by-side rows of tandem assemblies extending longitudinally therein with the axes of the separators at right angles to the axis of the drum casing, two rows being positioned side-by-side along each side of the drum casing and defining a central aisle extending lengthwise along the drum casing.

3. Vapor and liquid separating means according to claim 2 further including energy absorbing mesh means disposed at the outlet of each separator.

4. Vapor and liquid separating means according to claim 2 wherein said passage means communicating the separation chamber inlets with a casing inlet chamber comprises a Y-shaped supporting structure secured to the curved plate means;

said Y inlet chamber defining an inside passage and an outside passage each opening upwardly, each passage being in communication with a pair of back-to-back separators.

5. Vapor and liquid separating means according to claim 2 further including Venetian blind type steam scrubbing means disposed in said end wall openings of the separators.

6. Vapor and liquid separating means for a vapor generator comprising a drum casing having a generally cylindrical configuration, a longitudinal axis extending in a substantially horizontal plane;

a curved plate spaced from the inside of said drum casing along the lower side thereof substantially concentric with the casing defining with the casing opposed girth inlet chambers;

means to introduce a vapor and liquid mixture from the generator into said inlet chambers;

a plurality of can-like vapor and liquid separators on horizontal axes each comprising an outer plate means which includes a vertically oriented first section, a second section which defines a substantially involute curve curving about 250° from said first section, said first section defining a back face, said second section defining top and front axes, a separation chamber between said first section and front face, inner plate means within and spaced from the outer plate means approximately concentric with the outer plate means extending upwardly into said separation chamber defining a separation chamber inlet which has an upwardly extending first portion, and a forwardly curved second portion in communication with the first portion bending approximately 90° from the first portion;

baffle means inwardly spaced from said outer plate means front face extending downwardly and curved outwardly away from the separator inlet so that at least a portion of the flow from the separation chamber is deflected downwardly and outwardly relative the inlet end;

Y-shaped passage means communicating separation chambers inlets with a casing inlet chamber, each passage means defining an inside passage and an outside passage transversely disposed relative the longitudinal axis of the drum casing;

pairs of separators being positioned back-to-back in tandem relationship, a single passage means being common to both separation chamber inlets of each pair;

each passage means supporting two pairs of separators;

said separation chamber inlets causing a vapor and liquid mixture flowing therein to tangentially enter the separation chambers;

end walls for the separation chambers;

openings centrally disposed in the end walls for the flow of the vapor portion of the vapor and liquid mixture from the separators;

said separators being arranged within the drum casing in four side-by-side rows of tandem assemblies the rows extending longitudinally therein with the axes of the separators at right angles to the axes of the drum casing, two axes being positioned side-by-side of the drum casing and defining a central aisle extending lengthwise along the drum casing.

References Cited

UNITED STATES PATENTS

| 2,661,075 | 12/1953 | Brister | 55—349 XR |
| 2,675,888 | 4/1954 | Blizard et al. | 122—491 |
| 3,089,469 | 5/1963 | Mumford | 122—491 |
| 3,393,496 | 7/1968 | Worley et al. | 55—349 |

KENNETH W. SPRAGUE, *Primary Examiner.*

U.S. Cl. X.R.

55—349

UNITED STATES PATENT OFFICE
CERTIFICATE OF CORRECTION

Patent No. 3,450,106                                June 17, 1969

Harvey H. Nelken

It is certified that error appears in the above identified patent and that said Letters Patent are hereby corrected as shown below:

Column 3, line 65, "laternally" should read -- laterally --. Column 6, line 18, "axes" should read -- faces --; line 36, "pasage" should read -- passage --; line 55, "axes" should read -- rows --.

Signed and sealed this 27th day of October 1970.

(SEAL)
Attest:

Edward M. Fletcher, Jr.
Attesting Officer

WILLIAM E. SCHUYLER, JR.
Commissioner of Patents